(12) United States Patent
O'Connor

(10) Patent No.: US 7,635,141 B2
(45) Date of Patent: Dec. 22, 2009

(54) BICYCLE REAR SUSPENSION SYSTEM

(75) Inventor: D'Arcy O'Connor, Vancouver (CA)

(73) Assignee: Rocky Mountain Bicycles - a division of Procycle Group Inc., Delta, British Columbia (CA)

(*) Notice: Subject to any disclaimer, the term of this patent is extended or adjusted under 35 U.S.C. 154(b) by 139 days.

(21) Appl. No.: 12/043,224

(22) Filed: Mar. 6, 2008

(65) Prior Publication Data

US 2008/0303242 A1 Dec. 11, 2008

Related U.S. Application Data

(60) Provisional application No. 60/942,537, filed on Jun. 7, 2007.

(51) Int. Cl.
*B62K 25/26* (2006.01)
(52) U.S. Cl. ..................................... 280/284
(58) Field of Classification Search ................. 280/284, 280/283, 281.1
See application file for complete search history.

(56) References Cited

U.S. PATENT DOCUMENTS

| | | | |
|---|---|---|---|
| 5,509,679 A | 4/1996 | Leitner | |
| 5,678,837 A | 10/1997 | Leitner | |
| 6,199,886 B1 | 3/2001 | Guenther | |
| 6,264,585 B1 | 7/2001 | Beauchamp | |
| 6,375,210 B1 | 4/2002 | Lam | |
| 6,378,885 B1 | 4/2002 | Ellsworth et al. | |
| 6,450,520 B1 | 9/2002 | Girard | |
| 6,843,494 B2 | 1/2005 | Lam | |
| 7,160,230 B2 | 1/2007 | Tremblay | |
| 7,216,883 B2 | 5/2007 | O'Connor | |
| 2007/0049813 A1 | 3/2007 | Blouin | |
| 2007/0210555 A1 | 9/2007 | O'Connor | |

FOREIGN PATENT DOCUMENTS

| | | |
|---|---|---|
| CA | 2424428 | 3/2003 |
| CA | 2538467 | 9/2006 |
| CA | 2517184 | 2/2007 |
| EP | 0827902 | 3/1998 |

*Primary Examiner*—Tony H. Winner
(74) *Attorney, Agent, or Firm*—Ogilvy Renault LLP

(57) ABSTRACT

A bicycle rear wheel suspension system includes an upper link and a lower link both pivotally attached to the frame and to a rear stay member. An instantaneous center of rotation of the rear stay member is defined at an intersection between an upper axis extending through first and second pivots of the upper link and a lower axis extending through third and fourth pivots of the lower link. Throughout a travel distance of a shock absorber of the suspension system, the instantaneous center of rotation remains below an average chain torque line of the bicycle, the lower axis remains above an axle axis extending through the rear wheel axle, and a portion of the lower axis defined between the third and fourth pivots extends below the average chain torque line.

30 Claims, 8 Drawing Sheets

BICYCLE REAR SUSPENSION SYSTEM

CROSS-REFERENCE TO RELATED APPLICATIONS

The present application claims priority on U.S. Provisional Patent Application No. 60/942,537, filed Jun. 7, 2007, the entire contents of the specification of which is incorporated herein by reference.

TECHNICAL FIELD

The present invention relates generally to two-wheeled vehicles, particularly bicycles, and more specifically to a rear wheel suspension for such bicycles.

BACKGROUND ART

Rear wheel suspension systems have been used on a variety of two-wheeled vehicles, including motorcycles, scooters and bicycles, for providing improved rider comfort and increased performance.

Rear wheel suspensions on pedal powered bicycles have become increasingly popular, and generally provide a rider with the benefits of a more comfortable ride and better control over the bicycle. Such bicycle suspension systems improve ride quality by absorbing the energy incurred from encountering ground obstacles, rather than transmitting them through the frame to the rider. By maintaining greater contact between the tire and the ground, the suspension also provides the rider with better control for accelerating, braking, and cornering.

For a suspension to be suitable for use on a bicycle, it must be efficient. Ideally, a perfect rear wheel suspension would compress only in reaction to ground forces but not to drive-train or braking forces. Unwanted suspension movement resulting from drive train forces wastes rider energy.

Accordingly, there exists a need for an improved bicycle rear wheel suspension which reacts principally to ground forces and limits the action of drive-train and braking forces thereon.

SUMMARY OF THE INVENTION

It is therefore an aim of the present invention to provide an improved rear wheel suspension system for a bicycle.

Therefore, in accordance with the present invention, there is provided a bicycle frame set comprising: a main frame including at least a seat tube, a top tube, a head tube, a down tube, and a bottom bracket fixed to at least one of the seat tube and the down tube; and a rear wheel suspension system pivotally attached to the main frame, the rear wheel suspension system comprising: an upper link pivotally attached to the main frame at a first pivot point; a rear stay member having an upper end pivotally attached to the upper link at a second pivot point and a lower end having a dropout receiving a rear wheel axle of the bicycle, the rear wheel axle defining an axle axis about which the rear wheel rotates when mounted to the dropout; a lower link pivotally attached to the main frame at a third pivot point located on said main frame at a lower vertical elevation than the first pivot point, and the lower link being pivotally attached to the rear stay member at a fourth pivot point located on said rear stay member below said upper end thereof; and a shock absorber having a first end pivotally connected to the upper link and a second end pivotally connected to the main frame; wherein an instantaneous center of rotation is defined at an intersection between an upper axis extending through the first and second pivots and a lower axis extending through the third and fourth pivots, and an average chain torque line of the bicycle frame set is defined as an average of a number of possible chain torque lines extending along a tension side of a chain when the chain is positioned on chain sprockets of the bicycle frame set; and wherein, throughout a travel distance of the shock absorber, the instantaneous center of rotation remains below the average chain torque line, the lower axis remains above the axle axis, and a portion of the lower axis defined between the third and fourth pivots extends below the average chain torque line.

Also in accordance with the present invention, there is provided a bicycle comprising: a frame including a bottom bracket, a seat tube, a top tube, a head tube, and a down tube; and a rear wheel suspension system including: an upper link pivotally attached to the frame at a first pivot point; a rear stay member having an upper end pivotally attached to the upper link at a second pivot point and a lower end having a dropout within which an axle of a rear wheel of the bicycle is engaged, the rear wheel axle defining an axle axis about which the rear wheel rotates; a lower link pivotally attached to the main frame at a third pivot point located on said main frame at a lower vertical elevation than the first pivot point, and the lower link being pivotally attached to the rear stay member at a fourth pivot point located on said rear stay member below said upper end thereof; and a shock absorber having a first end pivotally connected to the upper link and a second end pivotally connected to the main frame; wherein an instantaneous center of rotation is defined at an intersection between an upper axis extending through the first and second pivots and a lower axis extending through the third and fourth pivots, and an average chain torque line of the bicycle frame set is defined as an average of a number of possible chain torque lines extending along a tension side of a chain when the chain is positioned on chain sprockets of the bicycle Frame set; and wherein, throughout a travel distance of the shock absorber, the instantaneous center of rotation remains below the average chain torque line, the lower axis remains above the axle axis, and a portion of the lower axis defined between the third and fourth pivots extends below the average chain torque line.

There is also provided, in accordance with another aspect of the present invention, a method of making a bicycle having a main frame and a rear wheel suspension system including a rear stay member pivotally attached to the main frame by upper and lower link members and a shock absorber mounted between the main frame and the upper link member, the upper and lower link members each having a forward and a rearward pivot thereon and respectively defining an upper and lower link axis extending between each of the forward and rearward pivots, a rear wheel of the bicycle having an axle mounted to the rear stay member, the axle defining an axle axis extending therethrough, the method comprising the step of: designing the rear wheel suspension system to have characteristics which remain throughout a travel distance of the shock absorber, said characteristics including an instantaneous center of rotation which remains below an average chain torque line, while the lower link axis remains above the axle axis and at least a portion of the lower link axis extends below the average chain torque line; and assembling the rear wheel suspension system by pivotally mounting the upper and lower link members to the main frame and the rear stay member in a relative geometric relationship which provides the designed characteristics of the rear wheel suspension system; wherein the instantaneous center of rotation is defined as a point at an intersection of the upper and lower link axis, and the average chain torque line is defined as an average of chain torque lines extending along a tension side of a chain of the bicycle when the chain is positioned on chain sprockets of the bicycle.

There is further provided, in accordance with another aspect of the present invention, a method of improving riding performance of a bicycle having a main frame and a rear wheel suspension system including a rear stay member pivotally attached to the main frame by upper and lower link members and a shock absorber mounted between the main frame and the upper link member, a rear wheel of the bicycle rotating about a rear wheel axle mounted to the rear stay member, the method comprising the steps of: defining an average chain torque line of the rear wheel suspension system by determining an average of a number of possible chain torque lines extending along a tension side of a chain when the chain of the bicycle when positioned on chain sprockets of the bicycle; defining an upper axis extending through first and second pivots of the upper link member and defining a lower axis extending through third and fourth pivots of the lower link member; defining an instantaneous center of rotation at an intersection between the upper axis and the lower axis; ensuring that the instantaneous center of rotation remains below the average chain torque line throughout a travel distance of the rear wheel suspension; ensuring that the lower axis remains above a transverse axle axis, extending through the rear wheel axle, throughout the travel distance of the rear wheel suspension; and ensuring that at least a portion of the lower axis defined between the third and fourth pivots of the lower link member extends below the average chain torque Sine throughout the travel distance of the rear wheel suspension.

BRIEF DESCRIPTION OF THE DRAWINGS

Reference will now be made to the accompanying drawings, showing by way of illustration a particular embodiment of the present invention and in which.

DETAILED DESCRIPTION OF PARTICULAR EMBODIMENTS

Figure 1:
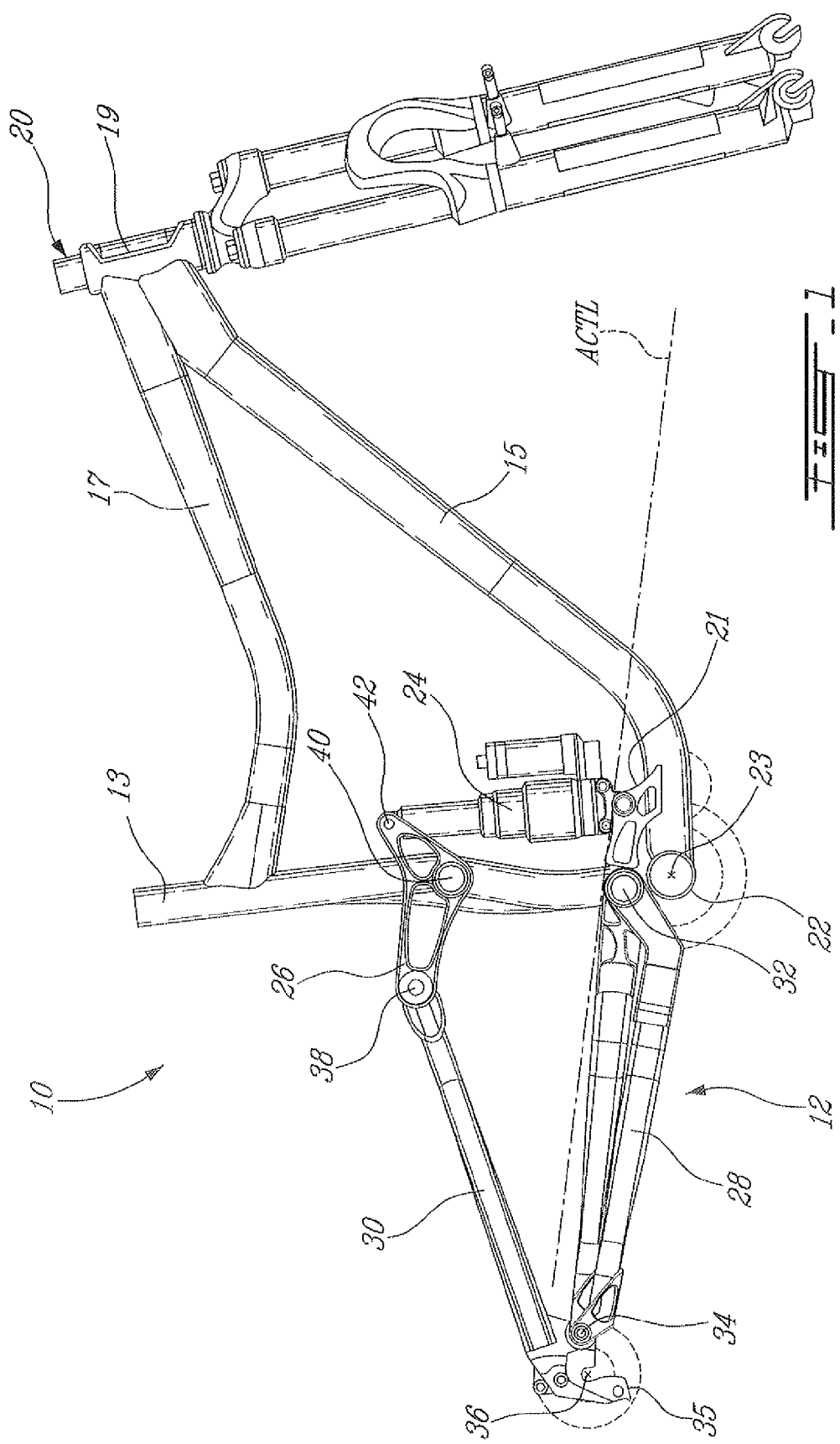
FIG. 1 is a schematic side view of a bicycle frame including a rear suspension system according to a particular embodiment of the present invention.

Referring to FIG. 1, a bicycle frame assembly according to a particular embodiment of the present invention is generally shown at 10, and comprises a rear suspension system linkage assembly 12 and a main frame 20. In a particular embodiment, the main frame 20 is manufactured out of aluminum, steel, carbon-fiber, or any other adequate material.

The main frame 20 comprises a seat tube 13, a down tube 15, a top tube 17, a head tube 19, and a bottom bracket 22. The bottom bracket 22 defines a crank axis 23 therethrough, about which the bicycle's pedal cranks rotate. In the embodiment shown, the seat tube 13 rigidly connects the bottom bracket 22 and the top tube 17. In an alternate embodiment, the seat tube 13 is of "partial length", i.e. rigidly suspended only from one of the tubes such as the top tube 17, for example.

In an alternate embodiment, the main frame 20 is a single large structure rather than the aforementioned assembly of distinct tubes, such as a monologue-type frame section which can be made for example of carbon fiber or sheet metal.

A springing and damping mechanism, or shock absorbing member, such as a shock absorber 24, is pivotally attached to the main frame 20, by a lower shock mounting bracket 21. In the embodiment shown, the lower shock mounting bracket 21 is secured within the main frame 20 between the seat tube 13 and the down lube 15, such as by welding or brazing. The shock absorber 24 provides a compression resistance force against which the rear suspension system linkage assembly 12 operates. In an alternate embodiment, the shock absorber 24 can alternately be mounted with equal effect elsewhere within the main frame 20 by attaching it to one or more of the other tubes, or outside the main frame 20, such as between an upper link member and the seat tube, for example.

The shock absorber 24 acts to counter any forces that may be applied to the rear suspension linkage assembly 12 by the rear wheel so as to tend to maintain the relative positions of the main frame 20 and the rear suspension linkage assembly 12 constant. Doing so thereby also tends to attempt to keep the rear wheel in substantially continuous contact with the ground thereby affording the rider greater control of the vehicle than would occur if the rear wheel is permitted to leave contact with the ground for significant periods of time. Having the rear wheel out of ground contact results in a significant decrease in the rider's ability to exert control over the vehicle. By doing so, the shock absorber 24 absorbs much of the energy which enters the vehicle through the rear wheel rather than having that energy transferred through the main frame 20 to the rider. As a result the rider experiences a more comfortable ride and is able to maintain better control over the vehicle. This is of particular significance when the vehicle is operated over highly uneven terrain such as takes place in the operation of mountain bicycles.

The linkage assembly 12 includes a pair of upper link members 26, a pair of lower link members 28, and a pair of rear stay members 30. The rear wheel of the bicycle is mounted between the pair of rear stay members 30 at dropouts 35 provided at the lower ends thereof. Hence, the rear wheel's axle, and, therefore, the rear wheel's central axis 36, is mounted within the dropouts 35.

The rear ends of the lower link members 28 are pivotally connected to the rear stay members 30 at a rear pivot point 34, and the front ends of the lower link members 28 are pivotally connected to the seat tube 13 of the main frame 20 at a front pivot point 32. The front pivot point 32 is located proximate the crank axis 23, and the rear pivot point 34 is located proximate the rear wheel's axis. The lower link members 28 are located such that their primary axis (i.e. the axis extending through the pivots 32, 34) is above the rear wheel axis 36 (i.e. the transverse axis extending through the axle of the rear wheel) throughout the travel of the rear wheel. The lower link members 28 are also located such that the portion of their primary axis defined between the pivots 32, 34 remains below the Average Chain Torque Line (ACTL) of the suspension system throughout the travel of the rear wheel. The average chain torque line represents the average of the various chain torque lines for possible gear selections at each given position throughout the wheel travel (i.e. compression level of the suspension system). The chain torque line is defined as a line extending along the tension side of the chain positioned on the chain rings (sprockets) of the bicycle. Thus the chain torque line is substantially tangent to the front and rear chain rings of the bicycle, and represents the line of action of torque transmission between the front pedal crank and the rear sprocket driving the rear wheel. The low position of the lower link members 28 and of the front pivot point 32 in particular advantageously reduces the load applied to the upper portion of the seat tube 13 and as such increases the overall stiffness and strength of the linkage assembly 12.

The rear ends of the upper link members 26 are pivotally connected to the top of the rear stay members 30 at a rear pivot point 38. The upper link members 26 are further pivotally connected, at an intermediate pivot point 40 which is located intermediate of their ends, to the seat tube 13 of the main frame 20. The intermediate pivot point 40 is substantially higher on the main frame 20 than is the front pivot point 32 of the lower link members 28. Additionally, the front ends of the upper link members 26 are pivotally connected to the top of the shock absorber 24 at a shock pivot point 42.

The effective length of the lower link member 28, i.e. the distance between the pivot points 32 and 34, is considerably greater than is the effective length of the upper link member 26, i.e. the distance between the pivot points 38 and 40. In a particular embodiment, the effective length of the lower link member 28 is approximately 3.7 times greater than the effective length of the upper link member 26.

In the embodiment shown, two link members 26 and two rear stay members 30 are provided, one of each type of member being located on a respective side of the vehicle's rear wheel and being symmetrical with the other. Two lower link members 28 are also provided, one on each side of the vehicle's rear wheel. The lower link members 28 are not symmetrical but are connected by the same pivots, so that their effective lengths are symmetrical. Alternately, all members can be symmetrical or asymmetrical, or only a single set of members can be used, i.e. located on a single side of the rear wheel.

Although not shown, each of the members (rear stay members 30, upper link members 26, and lower link members 28) which comprises the rear suspension linkage assembly 12 is preferably formed so as to be joined by a yoke to its counterpart member. As such, any potential that might otherwise occur for the counterpart members to twist vis-à-vis each other is thereby reduced significantly.

Although not shown, means can be provided for permitting the rider to be able to adjust the rear suspension system in order to adapt the system to variations in the terrain over which the vehicle is being operated, i.e. to restrict the length of the rear wheel travel for smooth terrain riding and allow for a maximum rear wheel travel for rougher terrain riding, with optionally one or more intermediate positions in between. Such means can include having a variable position for the pivot point 42, such as by providing the pivot point 42 in the form of a bolt or removable locking or quick release pin received in one of several holes, a crank controlling a rack and pinion arrangement, a spring biased detent pin and track, by incorporating complimentary locking surfaces on the bolt and upper link members combined with a continuous slot whereby the tightening of the bolt causes the surfaces to bind against each other, etc.

Figure 2:
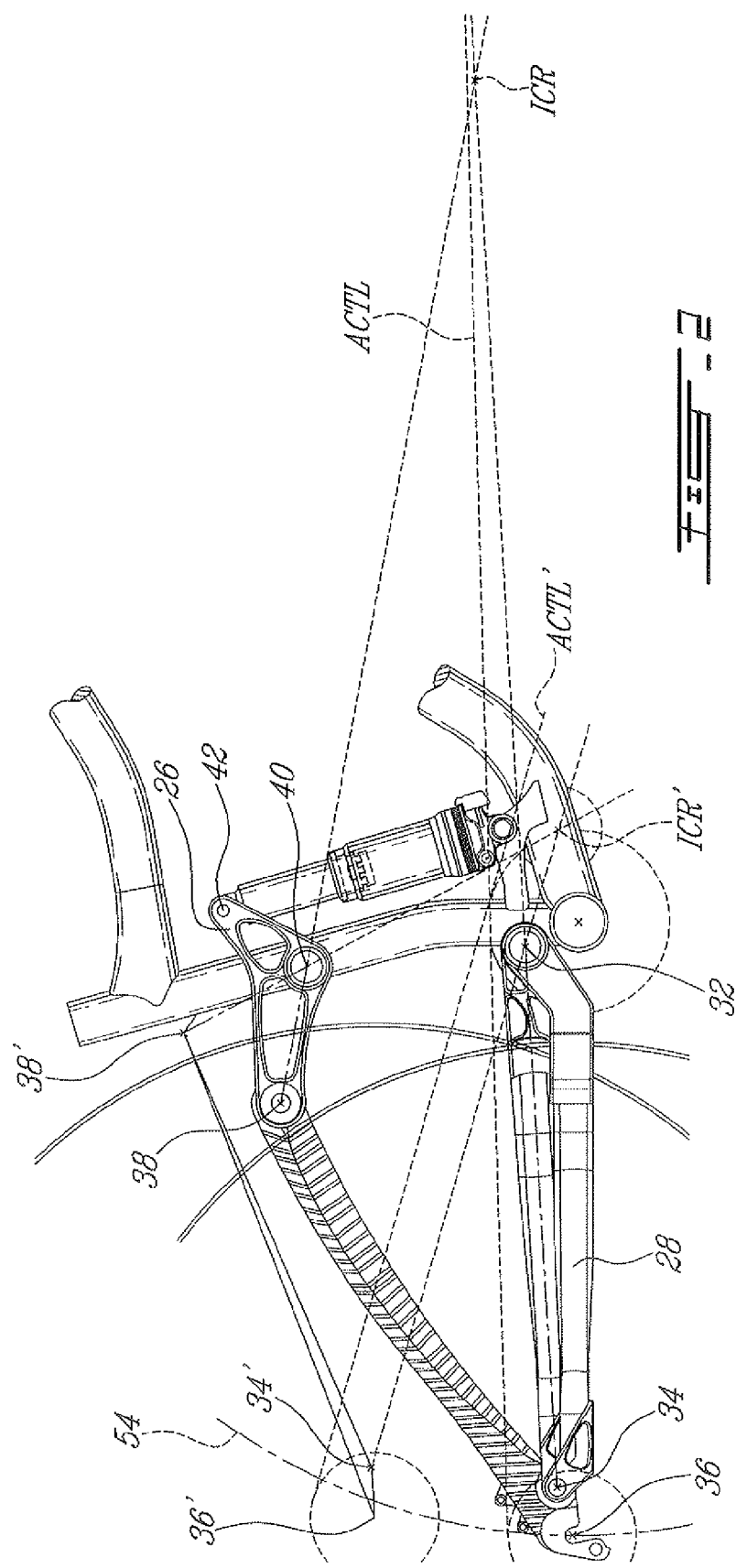
FIG. 2 is a schematic side view of part of the frame and suspension system of FIG. 1, showing the suspension system in fully compressed and fully extended positions.

Referring to FIG. 2, the instantaneous center of rotation (ICR) of the linkage assembly 12 is generally determined by the intersection of a first axis extending through the pivots 38, 40 of the upper link member 26 and of a second axis extending through the pivots 32, 34 of the lower link member 28. In the FIG. 34' and 38' are used to schematically indicate the position of the pivots 34 and 38 in the compressed position of the suspension system, while plain lines illustrate the various elements in the fully extended position, that is, the position where the suspension system is located when no loads are being applied to the system. Thus, it can be seen that the instantaneous center of rotation (ICR, ICR') of the assembly 12 throughout the entire wheel travel remains forward of the crank axis 23, remains below and close to the corresponding Average Chain torque Line (ACTL, ACTL'), and gets progressively lower as the suspension compresses.

Maintaining the instantaneous center of rotation close to the average chain torque line advantageously allows for the minimization of the squat effect produced by having the instantaneous center of rotation below the average chain torque line, thus allowing the suspension to work independently from pedaling forces and as such improve pedaling efficiency. In a particular embodiment, at 20% sag where the suspension is at the average pedaling position, the instantaneous center of rotation is in close proximity to the average chain torque line. The pedaling efficiency ($E_{ped}$) is, in at least one embodiment, directly proportional to the chain force (F) and inversely proportional to the distance (L) from the average chain torque line to the instantaneous center of rotation. This distance (L) from the average chain torque line to the instantaneous center of rotation is negative when the ICR is below the ACTL, thus causing the pedaling efficiency ($E_{ped}$) to be negative as well.

It can also be seen that the travel path of the rear wheel axis 36 does not follow a semi-circular shape 54, as would be the case with a rear wheel's axis pivoting about a fixed pivot point. The travel path is in fact between a semi-circular shape and a vertical line, which in combination with a limited but sufficient amount of chain stay length growth (as will be detailed further below) provides an "energy transfer effect" increasing pedaling efficiency, especially when going uphill, as the suspension produces a force quickly returning the rear wheel to the pedaling position when driving over an obstacle, while limiting the amount of pedaling energy wasted by the suspension system. Therefore, the pedaling efficiency is not sacrificed for rear wheel travel, such that the suspension, reacts largely to ground forces only and suspension activation is minimized even while the rider is pedaling hard.

Figure 3:
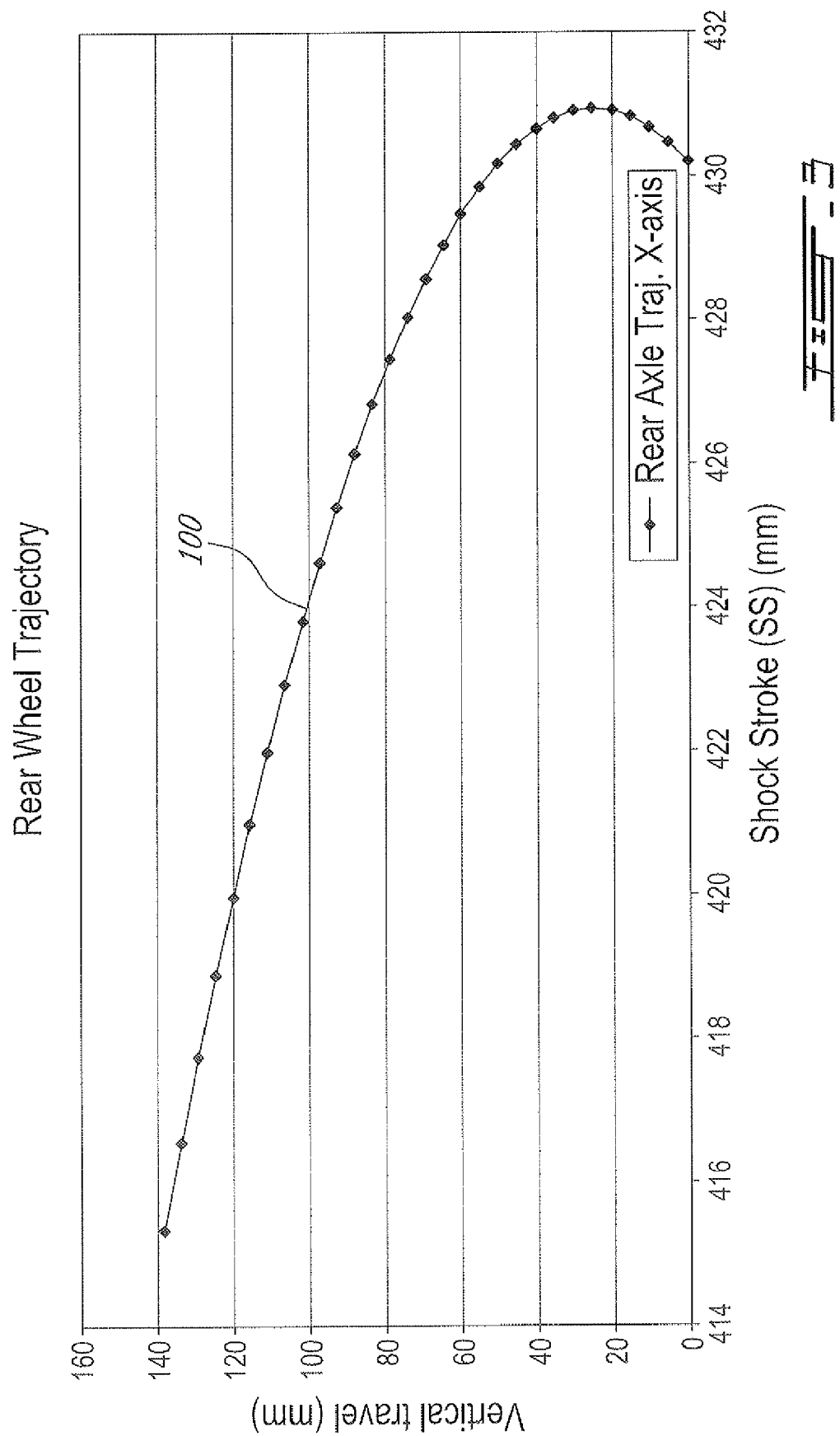
FIG. 3 is a graphical representation of a rear wheel trajectory of an example of a suspension system such as shown in FIG. 1.

Referring to FIG. 3, a rear wheel trajectory 100 for an example of a suspension system such as previously described and shown in FIGS. 1-2 (hereinafter "the exemplary suspension system") is graphically shown. In a particular embodiment, the rear wheel axis 36 in the fully compressed position is located approximately between 7% and 14% of the vertical travel in front of its location in the fully extended position, for example 16 mm in front of its location in the fully extended position for a vertical travel of 140 mm.

Figure 4:
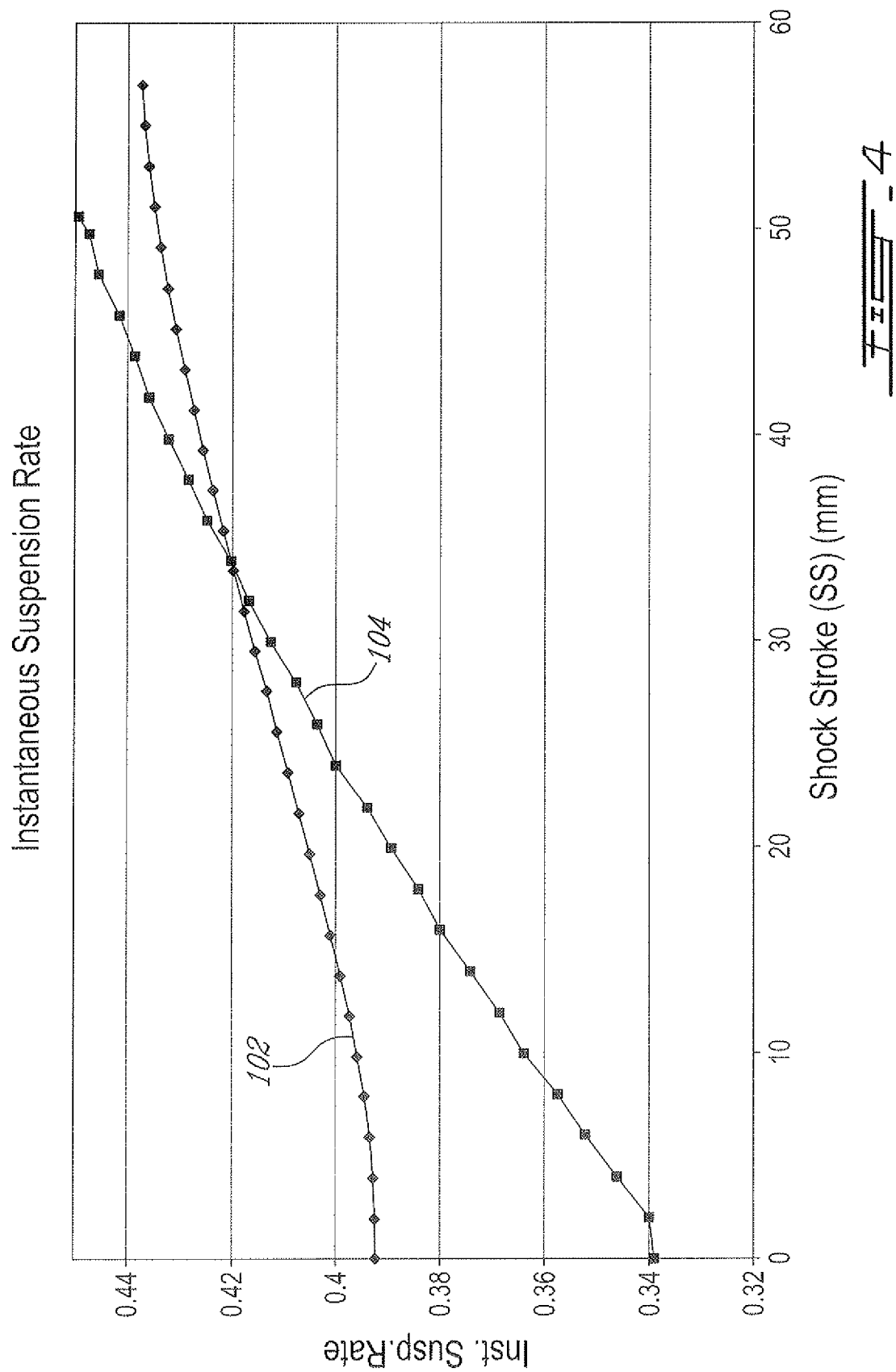
FIG. 4 is a graphical representation of an instantaneous suspension rate of an example of a suspension system such as shown in FIG. 1 and of an example of a suspension system in accordance with a prior design.

Referring to FIG. 4, an instantaneous suspension rate 102 as a function of shock stroke for the exemplary suspension system is graphically shown, in comparison with an instantaneous suspension rate 104 of a suspension system of a prior design (hereinafter "the prior suspension system"), which is exemplified in U.S. Pat. No. 6,843,494, issued Jan. 18, 2005 to Lam, the entire contents of which is incorporated herein by reference. The instantaneous suspension rate is computed as:

$$\text{Inst\_Suspension\_Rate} = \frac{\Delta \text{Shock\_Stroke}}{\Delta \text{Vertical\_Wheel\_Travel}}$$

It can be seen that the suspension rate 102 of the exemplary suspension system remains slightly more level than that of the prior suspension system, starting at a higher initial rate and finishing at a lower bottom-out rate. This more leveled curve, in combination with the use of a longer stroke shock (for example 0.25 inches longer) advantageously allows for a more unrestrictive movement through the suspension travel, and the higher initial rate allows for a lower air pressure required in the shock-absorber. As such, the rising rate of the exemplary suspension system can advantageously be higher than that of the prior suspension system, and in a particular embodiment, is approximately 2 times higher. The difference in variation of the instantaneous suspension rate is caused by the length difference between the lower link member 28 and the upper link member 26 being greater for the exemplary suspension system than for the prior suspension system (in a particular embodiment, approximately 3 times greater), thus increasing the counterclockwise rotation of the rear stay member 30 as viewed from the drive side of the bicycle. In a particular embodiment adapted for long distance cross-country marathon cycling, e.g. when the rider is not expected to drop the bicycle more than 4 feet as opposed to a freeride or downhill rider, the variation between the initial and bottom-out instantaneous suspension rate is between about 0.34 to about 0.45. The reduced variation in the instantaneous suspension rate facilitates the use of the entire travel of the suspension without sitting too far into the travel initially.

Figure 5:
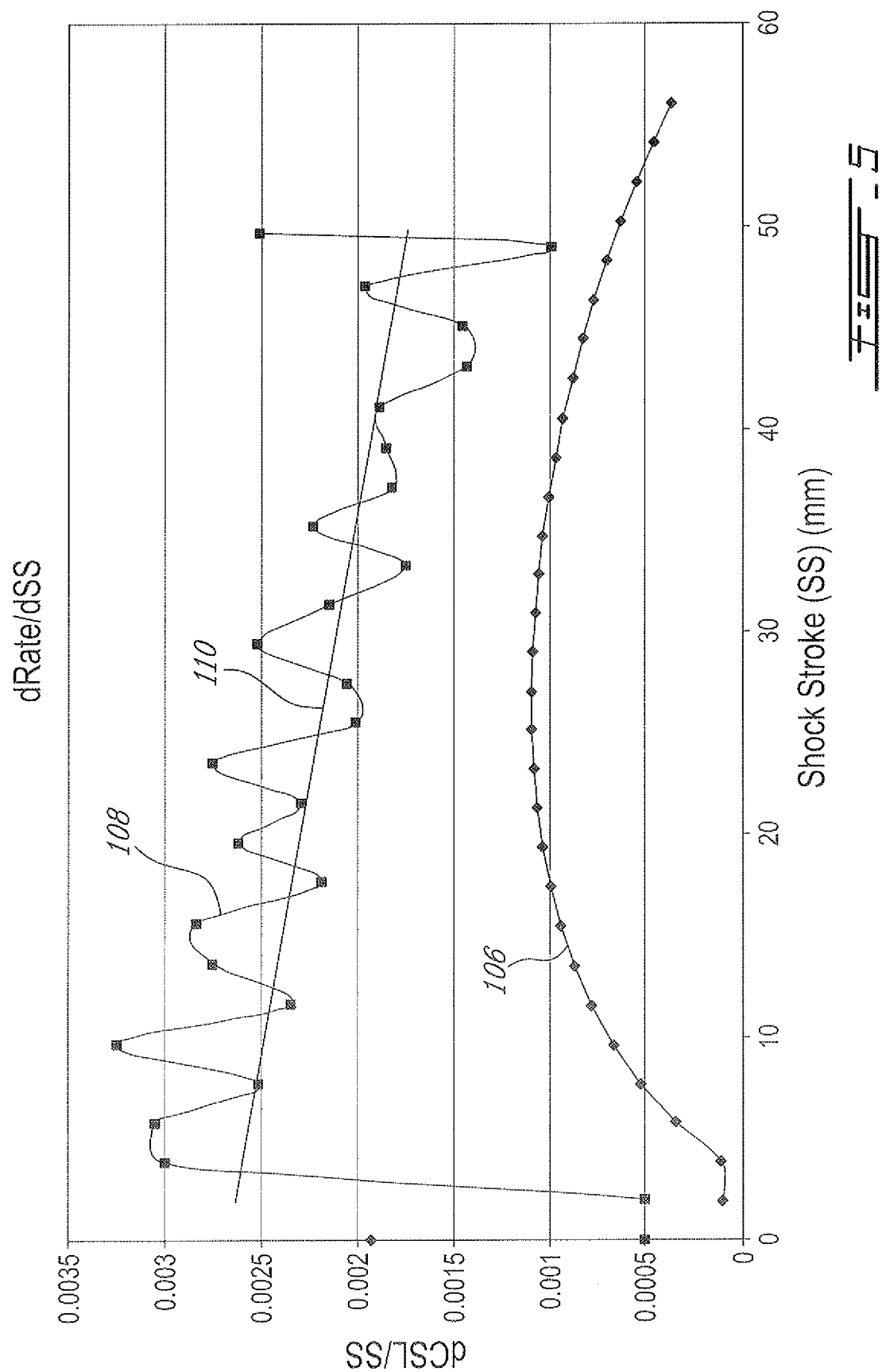
FIG. 5 is a graphical representation of the first derivative of the curves of FIG. 4.

Referring to FIG. 5, the first derivative 106 of the instantaneous suspension rate 102 of the exemplary suspension system is graphically shown, in comparison with the first derivative 108 of the instantaneous suspension rate 104 of the prior suspension system. A corresponding linear approximation 110 is also shown for the first derivative 108 of the prior suspension system. It can be seen that the first derivative 106 of the exemplary suspension system is a third order polynomial curve, and therefore has a continuously changing curvature. Generally speaking, in the example shown, the rate of change 106 of the instantaneous suspension rate for the exemplary suspension system is increasing for approximately the first 50% of suspension travel, and decreasing for the remaining suspension travel. The first portion of travel where the instantaneous suspension rate is continuously increasing causes the wheel to gradually ramp up to the point of inflexion following an exponential tendency, while the second portion of travel where the instantaneous suspension rate is continuously decreasing causes the wheel to gradually decrease to the bottom-out rate following a logarithmic tendency. This type of variation of the instantaneous suspension rate provides the rider with a more comfortable ride since the suspension does not feel as harsh as a suspension having a continuously decreasing rate of change for the instantaneous suspension rate, as shown at 108, 110 for the prior suspension system.

Figure 6:
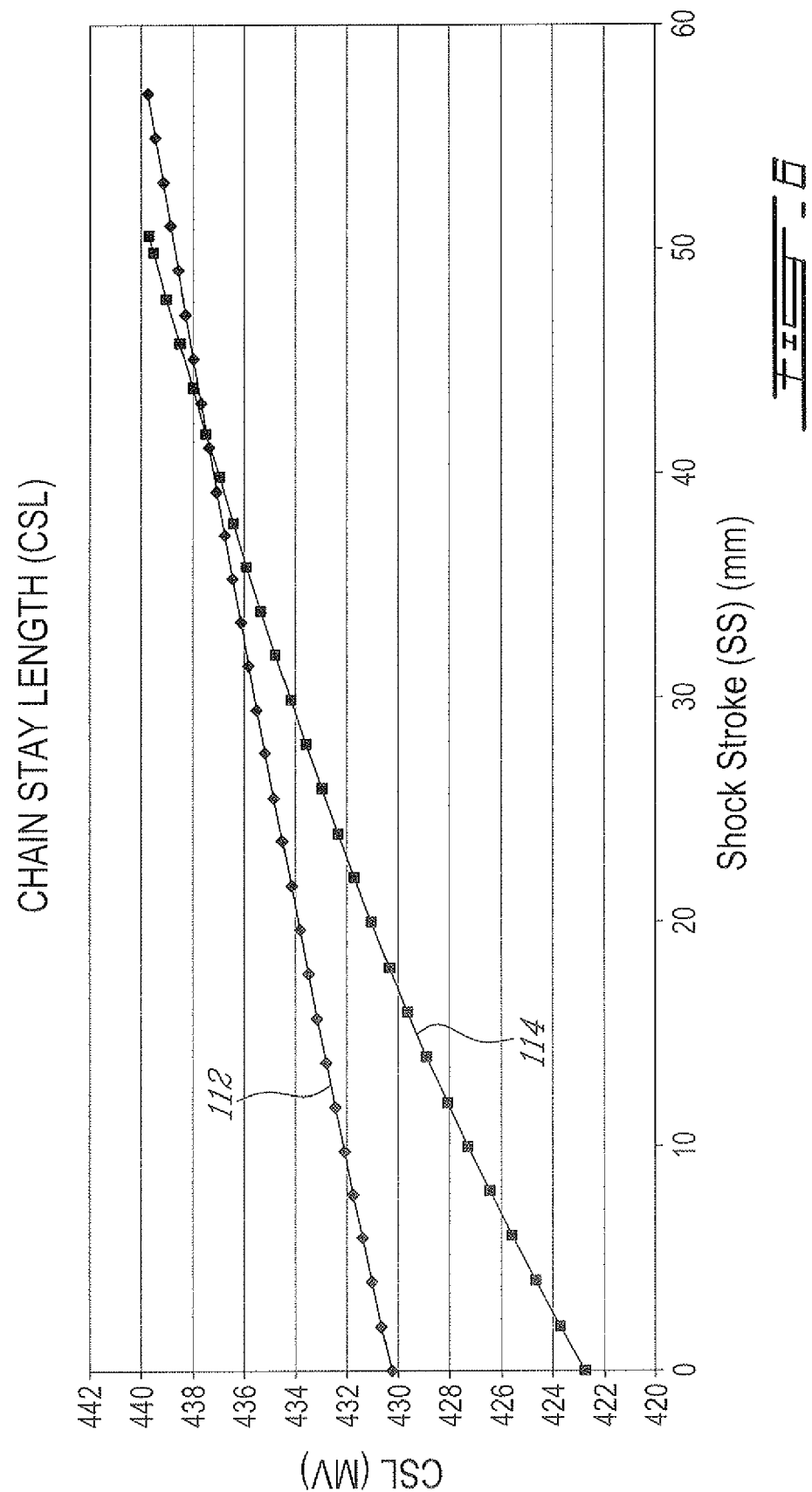
FIG. 6 is a graphical representation of a chain stay length of an example of a suspension system such as shown in FIG. 1 and of an example of a suspension system in accordance with a prior design.

Referring to FIG. 6, an example of a chain stay length 112 as a function of shock stroke of the exemplary suspension system is graphically shown, in comparison with the chain stay length 114 of the prior suspension system. It can be seen that the chain stay length growth throughout travel for the exemplary suspension system is approximately 9.5 mm, while in the prior suspension system it is approximately 17 mm. The reduced chain stay length growth of the exemplary suspension system advantageously allows for a reduction of pedal feedback, which is the force felt when the rear wheel hits a bump and chain stay lengthening causes the chain to apply a rearward torque at the bottom bracket spindle. While the chain stay lengthening is reduced in the exemplary suspension system, some chain stay lengthening is still maintained, which as mentioned above produces the desired "energy transfer effect" quickly returning the rear wheel to the pedaling position when driving over an obstacle and limiting the suspension travel when pedaling uphill. A chain stay length growth which is too high would result in excessive pedal feedback and as such would feel uncomfortable to the rider, while a chain stay length growth which is too low would not produce the desired result. As such, in a particular embodiment, the chain stay length growth is between about 8 to 1.7 mm for a vertical travel of about 140 mm, or between about 5% and 12% of the vertical wheel travel, to produce the above-mentioned "energy transfer effect".

Figure 7:
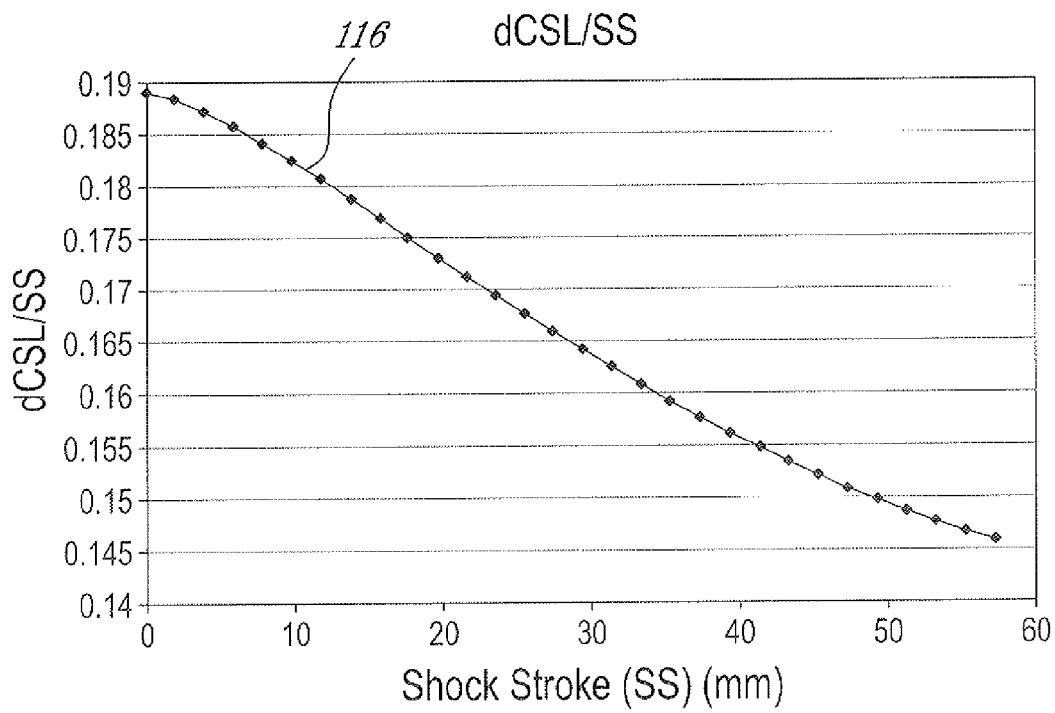
FIGS. 7 and 8 are graphical representations of the first derivative of the curves of FIG. 6.
Figure 8:
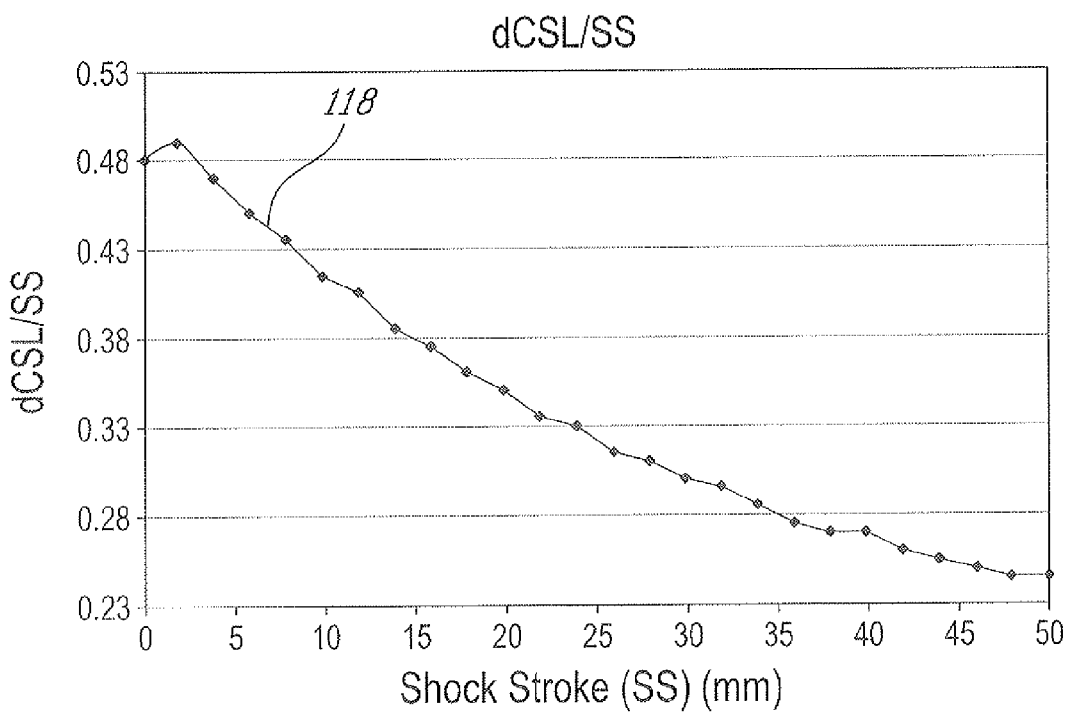
Figure 9:
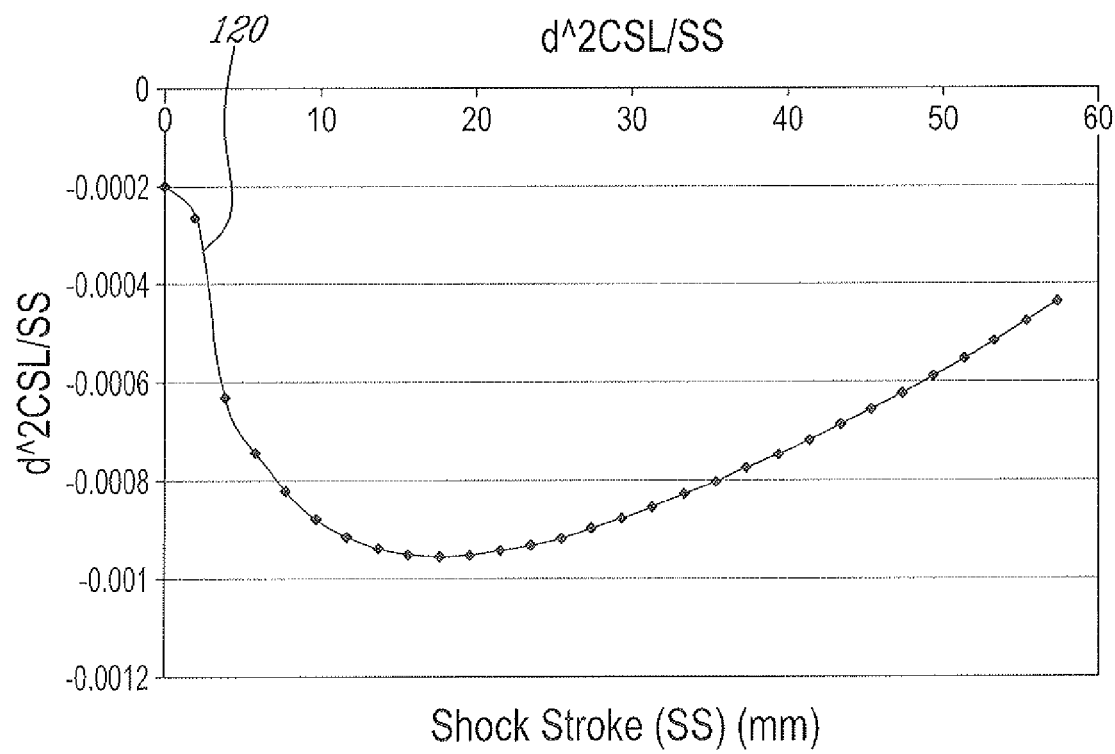
FIGS. 9 and 10 are graphical representations of the second derivative of the curves of FIG. 6.
Figure 10:
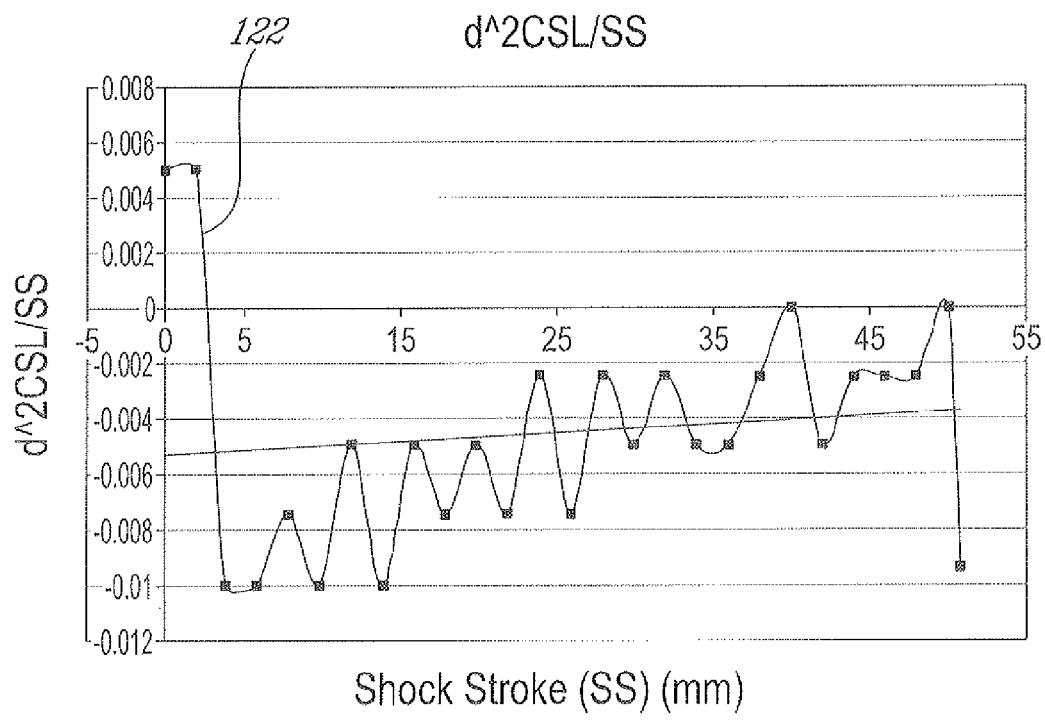

The first derivative 116 of the curve of chain stay length 112 of the exemplary suspension system is graphically shown in FIG. 7, the first derivative 118 of the curve of chain stay length 114 of the prior suspension system is graphically shown in FIG. 8, the second derivative 120 of the curve of chain stay length 112 of the exemplary suspension system is graphically shown in FIG. 9, and the second derivative 122 of the prior suspension system is graphically shown in FIG. 10. It can be seen that the prior suspension system exhibits a continuously decreasing rate of variation of the chain stay length rate of change as the suspension compresses, while the exemplary suspension system exhibits an increasing rate of variation of the chain stay length rate of change for a first portion of the travel and a decreasing rate of variation of the chain stay length rate of change for the remainder of the travel. The increasing then decreasing rate of variation of the chain stay length rate of change provides the rider with a more comfortable ride since the suspension does not feel as harsh as a suspension having a continuously decreasing rate of variation of the chain stay length rate of change such as the prior suspension system.

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A bicycle frame set comprising:
   a main frame including at least a seat tube, a top tube, a head tube, a down tube, and a bottom bracket fixed to at least one of the seat tube and the down tube; and
   a rear wheel suspension system pivotally attached to the main frame, the rear wheel suspension system comprising:
      an upper link pivotally attached to the main frame at a first pivot point;
      a rear stay member having an upper end pivotally attached to the upper link at a second pivot point and a lower end having a dropout receiving a rear wheel axle of the bicycle, the rear wheel axle defining an axle axis about which the rear wheel rotates when mounted to the dropout;
      a lower link pivotally attached to the main frame at a third pivot point located on said main frame at a lower vertical elevation than the first-pivot point, and the lower link being pivotally attached to the rear stay member at a fourth pivot point located on said rear stay member below said upper end thereof; and a shock absorber having a first end pivotally connected to the upper link and a second end pivotally connected to the main frame;

wherein an instantaneous center of rotation is defined at an intersection between an upper axis extending through the first and second pivots and a lower axis extending through the third and fourth pivots, and an average chain torque line of the bicycle frame set is defined as an average of a number of possible chain torque lines extending along a tension side of a chain when the chain is positioned on chain sprockets of the bicycle frame set; and wherein, throughout a travel distance of the shock absorber, the instantaneous center of rotation remains below the average chain torque line, the lower axis remains above the axle axis, and a portion of the lower axis defined between the third and fourth pivots extends below the average chain torque line.

2. The bicycle frame set according to claim 1, wherein the instantaneous center of rotation at the intersection between the upper axis and the lower axis moves away from the average chain torque line as the shock absorber compresses.

3. The bicycle frame set according to claim 2, wherein the instantaneous center of rotation at the intersection between the upper axis and the lower axis moves toward the bottom bracket as the shock absorber compresses.

4. The bicycle frame set according to claim 1, wherein a distance between the rear wheel axle and the bottom bracket increases continuously as the shock absorber compresses, the increase in distance between the bottom bracket and the rear wheel axle being between 5% and 12% of a vertical travel distance of the rear wheel axle throughout the travel distance of the shock absorber.

5. The bicycle frame set according to claim 4, wherein a rate of change of the distance between the rear wheel axle and the bottom bracket has a rate of change which increases for a first portion of the travel of the rear wheel axle and decreases for a remaining portion of the travel of the rear wheel axle.

6. The bicycle frame set according to claim 1, wherein an instantaneous suspension rate of the rear wheel suspension system varies within a range of 0.34 to 0.45 throughout the travel distance of the shock absorber.

7. The bicycle frame set according to claim 6, wherein the instantaneous suspension rate has a rate of change which increases for a first portion of the travel distance and decreases for a remaining portion of the travel distance.

8. The bicycle frame set according to claim 7, wherein the first portion is approximately 50% of the travel distance.

9. The bicycle frame set according to claim 1, wherein the fourth pivot point is located on the rear stay member between the upper and lower ends thereof.

10. The bicycle frame set according to claim 9, wherein the fourth pivot point is located proximate the lower end of the rear stay member at a point thereon disposed above the axle axis and below the average chain torque line.

11. A bicycle comprising;

a frame including a bottom bracket, a seat tube, a top tube, a head tube, and a down tube; and a rear wheel suspension system including:

an upper link pivotally attached to the frame at a first pivot point;

a rear stay member having an upper end pivotally attached to the upper link at a second pivot point and a lower end having a dropout within which an axle of a rear wheel of the bicycle is engaged, the rear wheel axle defining an axle axis about which the rear wheel rotates;

a lower link pivotally attached to the main frame at a third pivot point located on said main frame at a lower vertical elevation than the first pivot point, and the lower link being pivotally attached to the rear stay member at a fourth pivot point located on said rear stay member below said upper end thereof; and a shock absorber having a first end pivotally connected to the upper link and a second end pivotally connected to the main frame;

wherein an instantaneous center of rotation is defined at an intersection between an upper axis extending through the first and second pivots and a lower axis extending through the third and fourth pivots, and an average chain torque line of the bicycle is defined as an average of a number of chain torque lines extending along a tension side of a chain when the chain is positioned on chain sprockets of the bicycle; and wherein, throughout a travel distance of the shock absorber, the instantaneous center of rotation remains below the average chain torque line, the lower axis remains above the axle axis, and a portion, of the lower axis defined between the third and fourth pivots extends below the average chain torque line.

12. The bicycle frame set according to claim 11, wherein the instantaneous center of rotation at the intersection between the upper axis and the lower axis moves away from the average chain torque line as the shock absorber compresses.

13. The bicycle frame set according to claim 12, wherein the instantaneous center of rotation at the intersection between the upper axis and the lower axis moves toward the bottom bracket as the shock absorber compresses.

14. The bicycle frame set according to claim 11, wherein a distance between the rear wheel axle and the bottom bracket increases continuously as the shock absorber compresses, the increase in distance between the bottom bracket and the rear wheel axle being between 5% and 12% of a vertical travel distance of the rear wheel axle throughout the travel distance of the shock absorber.

15. The bicycle frame set according to claim 14, wherein a rate of change of the distance between the rear wheel axle and the bottom bracket has a rate of change which increases for a first portion of the travel of the rear wheel axle and decreases for a remaining portion of the travel of the rear wheel axle.

16. The bicycle frame set according to claim 11, wherein an instantaneous suspension rate of the rear wheel suspension system varies within a range of 0.34 to 0.45 throughout the travel distance of the shock absorber.

17. The bicycle frame set according to claim 16, wherein the instantaneous suspension rate has a rate of change which increases for a first portion of the travel distance and decreases for a remaining portion of the travel distance.

18. The bicycle frame set according to claim 17, wherein the first portion is approximately 50% of the travel distance.

19. The bicycle frame set according to claim 11, wherein the fourth pivot point is located on the rear stay member between the upper and lower ends thereof.

20. The bicycle frame set according to claim 19, wherein the fourth pivot point is located proximate the lower end of the rear stay member at a point thereon disposed above the axle axis and below the average chain torque line.

21. A method of making a bicycle having a main frame and a rear wheel suspension system including a rear stay member pivotally attached to the main frame by upper and lower link members and a shock absorber mounted between the main frame and the upper link member, the upper and lower link members each having a forward and a rearward pivot thereon and respectively defining an upper and lower link axis extending between each of the forward and rearward pivots, a rear wheel of the bicycle having an axle mounted to the rear stay member, the axle defining an axle axis extending therethrough, the method comprising the step of:

designing the rear wheel suspension system to have characteristics which remain throughout a travel distance of the shock absorber, said characteristics including an instantaneous center of rotation which remains below an average chain torque line, while the lower link axis remains above the axle axis and at least a portion of the lower link axis extends below the average chain torque line; and assembling the rear wheel suspension system by pivotally mounting the upper and lower link members to the main frame and the rear stay member in a relative geometric relationship which provides the designed characteristics of the rear wheel suspension system;

wherein the instantaneous center of rotation is defined as a point at an intersection of the upper and lower link axis, and the average chain torque line is defined as an average of chain torque lines extending along a tension side of a chain of the bicycle when the chain is positioned on chain sprockets of the bicycle.

22. The method according to claim 21, wherein the step of designing further includes designing the instantaneous center of rotation to move away from the average chain torque line as the shock absorber compresses.

23. The method according to claim 22, further comprising designing the instantaneous center of rotation to move toward a bottom bracket of the main frame as the shock absorber compresses.

24. The method according to claim 21, further comprising designing a distance between the rear wheel axle and a bottom bracket of the main frame to continuously increase as the shock absorber compresses, the increase in distance between the bottom bracket and the rear wheel axle being between 5% and 12% of a vertical travel distance of the rear wheel axle throughout the travel distance of the shock absorber.

25. The method according to claim 24, further comprising designing a rate of change of the distance between the rear wheel axle and the bottom bracket to have a rate of change which increases for a first portion of the travel of the rear wheel axle and decreases for a remaining portion of the travel of the rear wheel axle.

26. The method according to claim 21, further comprising designing to rear wheel suspension system to have an instantaneous suspension rate which varies within a range of 0.34 to 0.45 throughout the travel distance of the shock absorber.

27. The method according to claim 26, further comprising designing the instantaneous suspension rate to have a rate of change which increases for a first portion of the travel distance and decreases for a remaining portion of the travel distance.

28. The method according to claim 27, further comprising defining the first portion to be approximately 50% of the travel distance of the shock absorber.

29. The method according to claim 21, wherein the step of assembling includes locating the rearward pivot of the lower link member on the rear stay member at a point thereon proximate a lower end of the rear stay member, said point on the rear stay member being disposed above the axle axis and below the average chain torque line.

30. A method of improving riding performance of a bicycle having a main frame and a rear wheel suspension system including a rear stay member pivotally attached to the main frame by upper and lower link members and a shock absorber mounted between the main frame and the upper link member, a rear wheel of the bicycle rotating about a rear wheel axle mounted to the rear stay member, the method comprising the steps of;

defining an average chain torque line of the rear wheel suspension system by determining an average of a number of possible chain torque lines extending along a tension side of a chain when the chain of the bicycle when positioned on chain sprockets of the bicycle;

defining an upper axis extending through first and second pivots of the upper link member and defining a lower axis extending through third and fourth pivots of the lower link member;

defining an instantaneous center of rotation at an intersection between the upper axis and the lower axis;

ensuring that the instantaneous center of rotation remains below the average chain torque line throughout a travel distance of the rear wheel suspension;

ensuring that the lower axis remains above a transverse axle axis, extending through the rear wheel axle, throughout the travel distance of the rear wheel suspension; and ensuring that at least a portion of the lower axis defined between the third and fourth pivots of the lower link member extends below the average chain torque line throughout the travel distance of the rear wheel suspension.

\* \* \* \* \*